United States Patent
Paulus

(10) Patent No.: US 11,022,232 B2
(45) Date of Patent: Jun. 1, 2021

(54) VALVE WITH PROPORTIONAL ELECTROMAGNETIC ACTUATOR

(71) Applicant: Nicolas Paulus, Liege (BE)

(72) Inventor: Nicolas Paulus, Liege (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 15/707,677

(22) Filed: Sep. 18, 2017

(65) Prior Publication Data
US 2018/0094741 A1    Apr. 5, 2018

(51) Int. Cl.
| F16K 31/06 | (2006.01) |
|---|---|
| H01F 7/16 | (2006.01) |
| H01F 7/128 | (2006.01) |
| H01F 7/08 | (2006.01) |

(52) U.S. Cl.
CPC ...... *F16K 31/0675* (2013.01); *F16K 31/0668* (2013.01); *H01F 7/081* (2013.01); *H01F 7/128* (2013.01); *H01F 7/1638* (2013.01); *F16K 31/061* (2013.01); *H01F 2007/083* (2013.01); *H01F 2007/086* (2013.01)

(58) Field of Classification Search
CPC ............. F16K 31/0675; F16K 31/0668; F16K 31/061; H01F 7/1638; H01F 7/081; H01F 7/128; H01F 2007/086; H01F 2007/083
USPC .......... 251/129.08, 129.15–129.16; 335/279, 335/281, 297
See application file for complete search history.

(56) References Cited

U.S. PATENT DOCUMENTS

| | | | | |
|---|---|---|---|---|
| 2,407,963 A * | 9/1946 | Persons | ...................... | H01F 7/13 335/260 |
| 3,168,242 A * | 2/1965 | Diener | ............... | G05D 23/1906 236/75 |
| 4,604,600 A * | 8/1986 | Clark | ........................ | H01F 7/13 335/261 |
| 5,066,980 A * | 11/1991 | Schweizer | ................ | H01F 7/13 335/255 |
| 5,565,832 A * | 10/1996 | Haller | ...................... | H01F 7/088 335/247 |
| 5,924,675 A * | 7/1999 | Hussey | .................. | H01F 7/1607 251/129.15 |
| 6,615,780 B1 * | 9/2003 | Lin | ............................ | F01L 1/34 123/90.11 |
| 6,877,717 B2 * | 4/2005 | Collins | ................... | B60T 8/363 251/129.15 |
| 7,874,541 B2 * | 1/2011 | Abe | ..................... | F16K 31/0613 137/625.69 |
| 8,844,900 B2 * | 9/2014 | Hoppe | .................. | F16K 31/061 251/129.15 |
| 9,033,309 B2 * | 5/2015 | Rampen | ................ | F04B 7/0076 251/129.15 |

* cited by examiner

*Primary Examiner* — John Bastianelli
(74) *Attorney, Agent, or Firm* — Sandberg Phoenix & Von Gontard PC

(57) ABSTRACT

Proportional electromagnetic actuator comprising: a magnetic casing; an electromagnetic plunger movable relative to the casing and having a first axial half; a first radial gap and a second radial gap which are each formed radially between the plunger and the casing, and which are positioned axially at the first axial half of the plunger. These gaps (26; 28) are formed by concentric annular chamfers (32; 34). A three-way valve for turbojet oil, which is actuated by an electromagnetic actuator with double chamfered gaps.

18 Claims, 4 Drawing Sheets

VALVE WITH PROPORTIONAL ELECTROMAGNETIC ACTUATOR

TECHNICAL FIELD

The invention relates to the field of electromagnetic actuators. More precisely, the invention concerns a proportional electromagnetic actuator in which the magnetic circuit is chamfered. The invention also relates to a valve equipped with an electromagnetic actuator.

PRIOR ART

A proportional electromagnetic actuator may be used in order to precisely control the position of the plunger and provide progressive mechanical operation. For this purpose, such an actuator has a magnetic circuit with a chamfer formed on the plunger. The circular point of this chamfer closes the magnetic circuit around the core of the magnetic circuit, and makes use of magnetic saturation phenomena in order to modulate the force generated by the plunger as a function of the electrical power supply to the electromagnetic coil. Because a proportional spring is used, the proportional force of the plunger is converted to a proportional displacement as a function of the supply current.

The document US2002000530 A1 discloses an electromagnetic valve for hydraulic control. The valve comprises a cylindrical core and a plunger forming an annular gap within the coil. The plunger has a cavity surrounded by a tubular end chamfered at the gap, the cavity being capable of receiving a portion of the core. However, the travel of this valve is limited. Moreover, the force produced by the actuator remains weak.

The document JP2006097727 discloses a proportional solenoid valve with a plunger sliding in a casing inside the coil. The casing and the plunger form a radial gap between them. For this purpose, the casing has an annular portion chamfered along the gap to allow proportional control of the plunger. However, the size of the coil is large relative to that of the plunger, thereby increasing the weight of the solenoid valve. Additionally, the field lines follow a number of changes of direction in the plunger, making it necessary to thicken the latter and ultimately to make the solenoid valve heavier.

BRIEF DESCRIPTION OF THE INVENTION

Technical Problem

The object of the invention is to resolve at least one of the problems posed by the prior art. More precisely, the object of the invention is to increase the force produced by an electromagnetic valve. Another object of the invention is to propose a solution which is simple, strong, light, economical, reliable, easily produced, convenient to maintain, simple to inspect, and with improved sealing.

Technical Solution

The invention proposes an electromagnetic actuator, notably a proportional electromagnetic actuator, the actuator comprising: a magnetic casing; an electromagnetic plunger movable in an axial direction relative to the casing, the plunger comprising a first axial half; and a first radial gap which is formed radially between the plunger and the magnetic casing, and which is positioned axially at the first axial half of the plunger; the actuator being remarkable in that it further comprises a second radial gap which is formed radially between the plunger and the magnetic casing, and which is positioned axially at the first axial half of the plunger.

According to particular embodiments, the actuator may comprise one or more of the following characteristics, chosen in isolation or in all technically feasible combinations:

The first gap and the second gap are formed from the same axial end of the plunger, and/or from the same axial end of the casing.

The first gap and the second gap are positioned at the same level axially or are axially offset.

The plunger is at least movable between a first position and a second position in which the radial thickness of at least one gap or of each gap remains equal.

The casing comprises a portion made in one piece, radially delimiting the first gap and the second gap.

The actuator comprises a magnetic source capable of producing an electromagnetic field in the casing and the plunger, at least one gap or each gap being positioned outside said magnetic source, the plunger possibly being positioned outside said magnetic source.

The casing and the plunger delimit an annular enclosure between them, the enclosure possibly having a vent passing through the casing.

The plunger comprises a tubular portion positioned radially between the first gap and the second gap, possibly from the first position to the second position.

The tubular portion of the plunger has an axially constant radial thickness.

The casing comprises a first annular chamfer radially delimiting the first gap, and/or a second annular chamfer radially delimiting the second gap.

The second chamfer is positioned radially in the plunger and/or in the first chamfer.

At least one, or each, annular chamfer has an annular profile which is curved or substantially straight.

At least one, or each, annular chamfer has an annular profile which is generally inclined at an angle β to the axis of movement of the plunger, said angle β being less than or equal to 45° or 30° or 20°.

The casing comprises an annular partition radially connecting the first gap to the second gap.

The axial thickness of the partition is less than its radial height, and/or less than the thickness of the annular chamfers.

The casing comprises a core and a cover which between them enclose an annular chamber, notably for the magnetic field source.

The cover and/or the core are each made in one piece.

The core comprises an outer ring and an inner bar separated from the outer ring, the annular partition possibly being formed by a coil support.

The first gap and the second gap overlap axially, possibly over their whole length, and/or have the same axial length, and/or are fitted on to one another.

The first gap and/or the second gap each have a circular shape and/or a tubular shape.

Each gap diameter is fixed, notably over the whole axial length of at least one, or each, gap.

The axial thickness of the partition is less than the radial offset between the first gap and the second gap.

The annular chamber is enclosed by the core and by the cover.

The outer ring and the inner bar are connected via the cover and/or via the coil support.

The outer ring and the inner bar each delimit one of the gaps.

The casing and the plunger form a closed magnetic circuit between them.

At one or more gaps, or at each gap, the plunger slides against or along the casing.

The travel of the plunger is perpendicular to each gap.

Each gap is outside the coil, and the plunger is, notably, outside the coil.

The actuator comprises a proportional spring.

The presence of the second gap is not an essential feature of the invention. The invention also proposes an electromagnetic actuator comprising a magnetic circuit with: a magnetic casing; an electromagnetic plunger which is axially movable relative to the casing; and a circularly chamfered portion forming a radial gap between the plunger and the magnetic casing, the chamfered portion having a curved profile of revolution.

The invention also proposes an electromagnetic actuator, notably for a valve, the actuator comprising a magnetic circuit with: a magnetic casing; an electromagnetic plunger which is axially movable relative to the casing; a magnetic field source, notably an electromagnetic coil, capable of generating a magnetic field; a chamfered portion delimiting a radial gap between the plunger and the casing, said chamfered portion being outside the magnetic field source, and possibly at an axial distance from the magnetic field source.

The invention also proposes an electromagnetic valve for fluids, notably a valve for a space vehicle or a turbojet, comprising an actuator, characterized in that electromagnetic actuator conforms to the invention, and the valve is preferably a three-way valve.

According to an advantageous embodiment of the invention, the valve comprises a passage for the fluid, a housing in which the plunger is positioned, and a duct for the fluid between the housing and the passage.

In a general manner, the advantageous embodiments of each object of the invention are equally applicable to the other objects of the invention. As far as possible, each object of the invention can be combined with the other objects. The objects of the invention can also be combined with the embodiments of the description, which can also be combined with one another.

Advantages Provided

The invention makes it possible to reduce the path followed axially by the flux lines in the plunger. Thus these flux lines follow a shorter path, that is to say a more radially perpendicular path across the plunger. Because of this distinctive feature of the invention, the plunger may be made thinner and therefore lighter. As its inertia decreases, its response time improves.

The configuration with two overlapping gaps significantly improves the force that can be supplied by the plunger, while retaining its proportional nature, over the whole of its travel, which may also be extended. As a result of this, the coil may be made smaller, which is compatible with a configuration in which the plunger is outside the coil. The length of the coil also decreases. Its design becomes independent of the dimensions of the plunger, and vice versa. Furthermore, the diameters of the gaps become independent of that inside the coil.

Placing the gaps on the same side of the plunger and the casing improves the sealing and simplifies the provision that must be made to maintain sealing. The casing then forms a sealed barrier delimiting the coaxial gaps. It becomes easier to form a separation to prevent leaks between the fluid part and the electrical part. In some configurations, the fluid no longer penetrates into the coil, making it possible to avoid the constraints relating to corrosive fluids. The use of parts made in one piece also avoids problems due to defects in welds or in the incorporation of applied joints. The cost of assembly may then be reduced.

DESCRIPTION OF THE EMBODIMENTS

Figure 1:
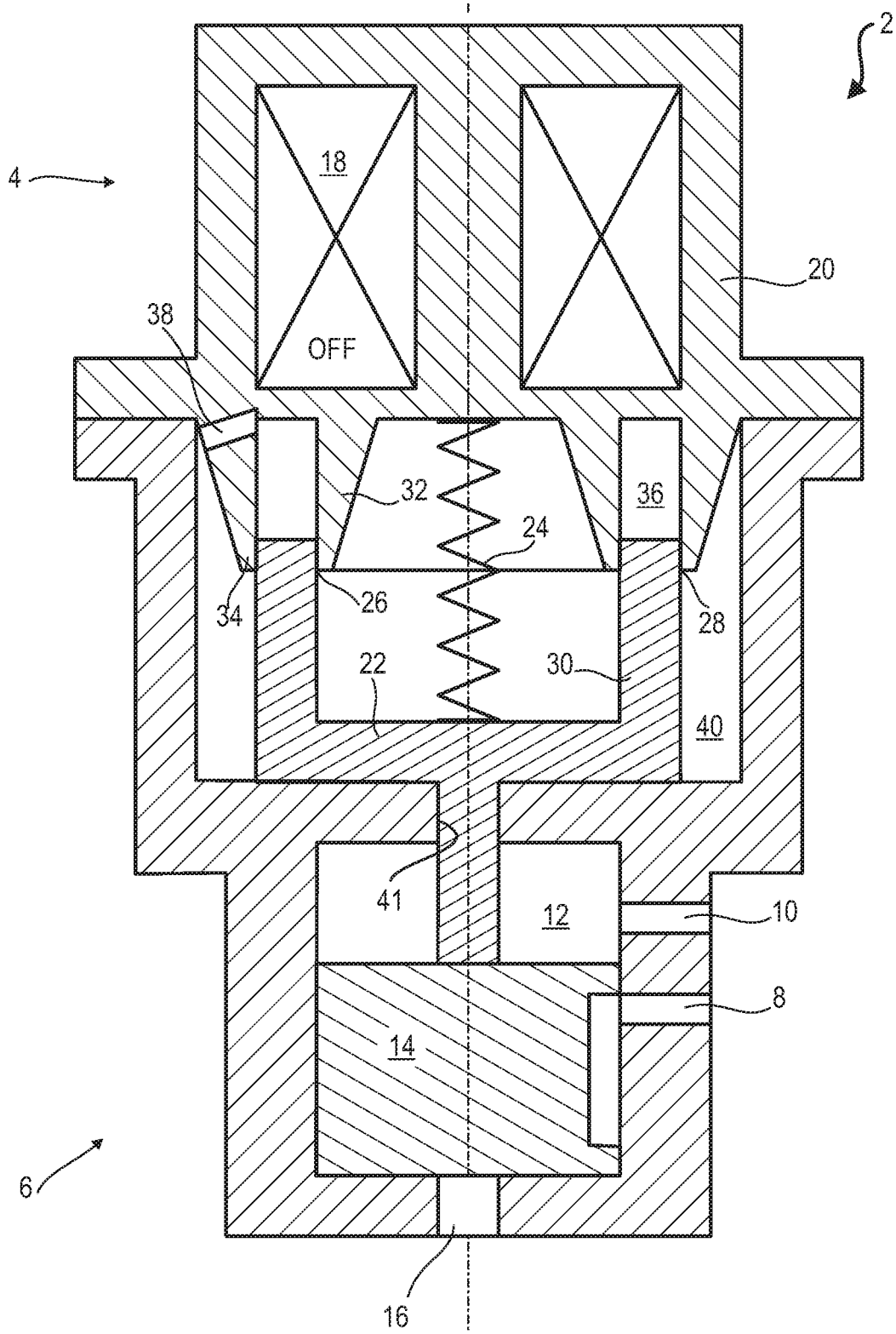
FIG. 1 shows an electromagnetic valve in a closed configuration according to the invention.

In the following description, the axial direction refers to the direction of translation of the plunger. The transverse direction and the radial direction are perpendicular to the axial direction. The term "radial gap" is taken to mean a gap through which the flux lines of the magnetic field pass essentially radially. FIG. 1 shows an electromagnetic valve 2 in a simplified manner, said valve being represented in cross section. The electromagnetic valve 2 may be a turbojet valve or a spacecraft valve; that is to say, it is designed to resist vibrations generating accelerations of at least 10 g or 20 g or 60 g. In the case of a turbojet, the valve may distribute corrosive engine oil whose temperature may exceed 200° C.

The electromagnetic valve 2 comprises an electromagnetic actuator 4 and a control portion 6 which regulates the flow of the fluid. The fluid may be oil or liquefied gas. The gas may be a cryogenic gas. The control portion 6 comprises a body with an inlet 8, an outlet 10 and a passage 12 connecting the inlet 8 to the outlet 10. The electromagnetic valve 2 also has a shutter 14, possibly of the slide valve type, capable of opening and closing the flow of fluid between the inlet 8 and the outlet 10. Optionally, the control portion may have a vent 16, in communication with the shutter 14 for example. The electromagnetic valve 2 may be of a three-way type.

Other control portion configurations may be envisaged. For example, the inlet and outlet may be positioned on the transversely opposed sides of the shutter. There may be an aperture passing through the shutter. The inlet and outlet may be positioned on two axially opposed faces.

The electromagnetic actuator 4 comprises a magnetic circuit with a magnetic field source 18, such as an electromagnetic coil or a proportional solenoid, a casing 20, and a plunger 22 which drives the translation of the shutter 14. A proportional spring 24 enables the plunger 22 to be kept in a first position corresponding to the closed position of the shutter 14 and therefore of the electromagnetic valve 2.

When the source 18 is supplied with electricity, it produces a magnetic field which is propagated in the casing 20 and in the plunger 22. This magnetic field passes through the first gap 26, which may be internal, and the second gap 28, which may be external. These gaps (26; 28) are radial gaps. They are present on the same axial end of the plunger 22, and are contained in the same axial half or the same axial third or the same axial quarter of the plunger 22. Their shape is circular, notably tubular. The plunger 22 may comprise a tubular portion 30 engaged between the gaps (26; 28) which are also delimited by annular chamfers (32; 34) formed on the casing 20.

The annular chamfers (32; 34) are formed by circular blocks of the casing 20. The inner chamfer 32 is surrounded by the plunger 22, notably by its tubular portion 30 which is itself encircled by the outer chamfer 34. Each of these annular chamfers (32; 34) has a thinner area, notably circular, positioned axially towards the plunger 22, and/or towards the closed position of the plunger 20. Thus, each axial end of the annular chamfers (32; 34) limits the annular flux passing through it because of the phenomenon of saturation induction.

As it slides, the plunger 22 is engaged in the casing 20. These components delimit between them an annular enclosure 36 whose annular walls may correspond to the gaps (26; 28). In order to simplify the discharge of the fluid from the enclosure 36, a vent 38 passes through the casing locally. This vent 38 may pass through one of the annular chamfers (32; 34), for example the outer chamfer. This vent 38 becomes useful because the fluid from the electromagnetic valve 2 may reach the housing 40 receiving the plunger 22, and therefore the annular enclosure 36, after passing along a duct 41. The duct 41 may be a leakage path from the passage 12 to the housing 40.

Figure 2:
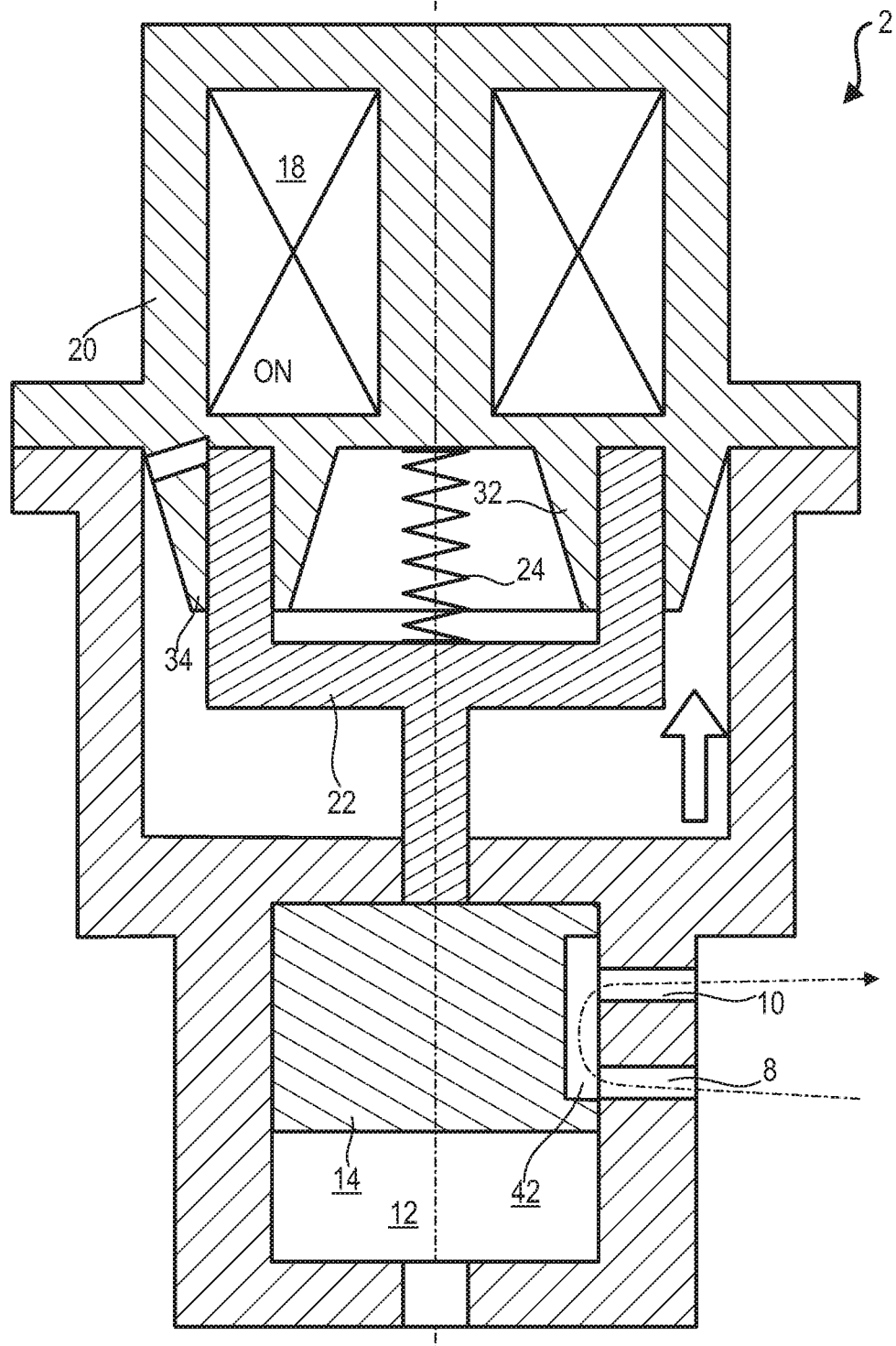
FIG. 2 shows an electromagnetic valve in an open configuration according to the invention.

FIG. 2 shows the electromagnetic valve 2 of FIG. 1 in an open configuration.

The magnetic source 18 is supplied with power so that the magnetic field produced by it generates a force which moves the plunger 22, overcoming the holding force of the spring 24, which is compressed. The plunger 22 is pushed into the casing 20 and is lodged between the annular chamfers (32; 34). The reluctance of the magnetic circuit changes.

In response to the supply of electricity to the source 18, the plunger 22 moves to a second position, being followed by the shutter 14 which reaches an open position. The inlet 8 is in communication with the outlet 10 via the passage 12, and possibly via a lateral groove 42 formed in the shutter 14.

Figure 3:
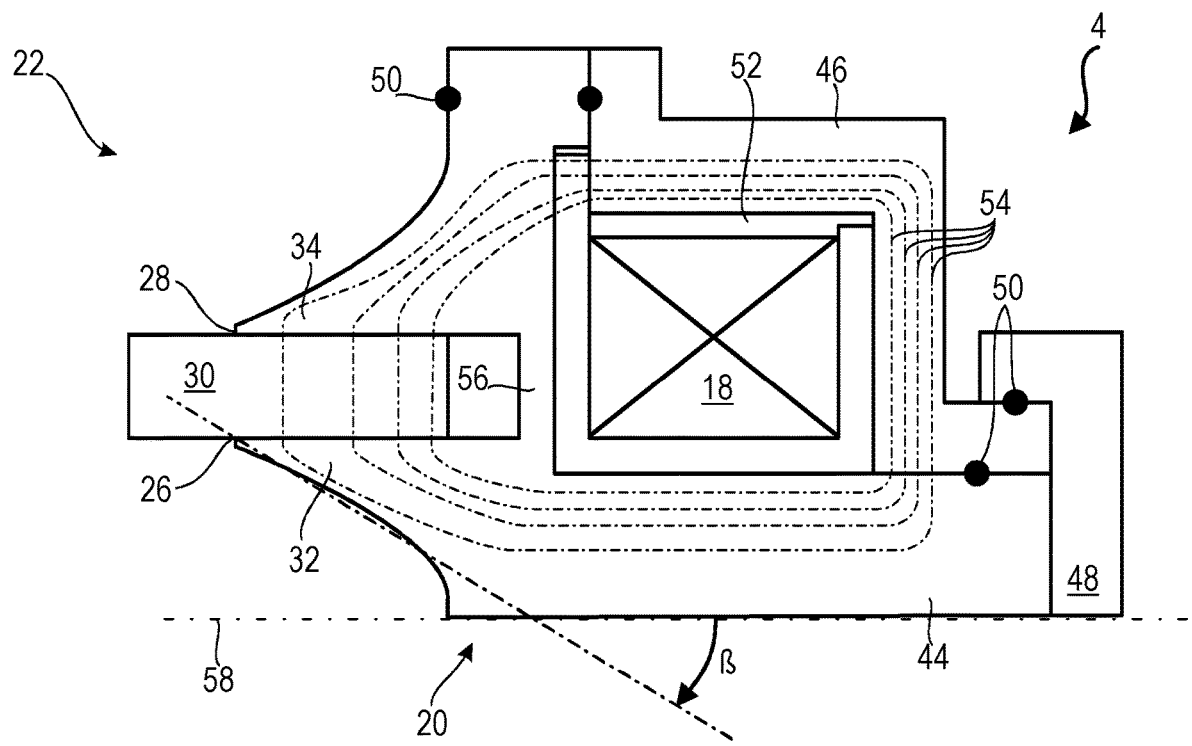
FIG. 3 shows an electromagnetic actuator according to a first embodiment of the invention.

FIG. 3 is a sketch of an enlargement of an electromagnetic actuator 4 such as that shown in relation to FIGS. 1 and 2. It is represented by one half, the tubular part 30 of the plunger 22 occupying an intermediate position.

The casing 20 comprises a core 44, a cover 46, and optionally a plug 48 which improves sealing by being fitted around the core 44 and the cover 46. Circular gaskets 50 may further improve the sealing, including the sealing with the valve body. The core 44, the cover 46, and the plunger 22 may be made of ferromagnetic materials. At least one, or each, of them is solid, and possibly made in one piece.

The core 44 and the cover 46 delimit an annular chamber 52 receiving the magnetic source 18. They form a closed loop in the magnetic circuit, and guide magnetic flux lines 54. These lines 54 run along the annular chamfers (32; 34) as well as the radial gaps (26; 28), and pass radially through the plunger 22, particularly its tubular portion 30.

The core 44 has an annular partition 56 forming a mechanical connection between the annular chamfers (32; 34), and possibly a magnetic junction in the circuit. This partition 56 may be thinner than its radial height. It may be made thinner to promote saturation induction, so that the flux lines 54 essentially run along the annular chamfers (32; 34); this improves the force that can be produced by the electromagnetic actuator 4. The axial thickness of this partition 56 may be less than, or at least twice as small as, the average radial thickness of at least one, or each, annular chamfer (32; 34).

The annular chamfers (32; 34) may comprise generally conical surfaces. These surfaces may be axially concentric. They may each of a profile of revolution about the central axis 58 of the electromagnetic actuator 4, this being the axis 58 along which the plunger 22 is translated. At least one, or both, of these profiles of revolution may be straight or curved. For example, the envelopes of the annular chamfers (32; 34) may form quadrangles of revolution. The profiles of revolution may be inclined at an angle β to the central axis 58, the angle β being between 5° and 45°, or possibly between 10° and 25°.

Figure 4:
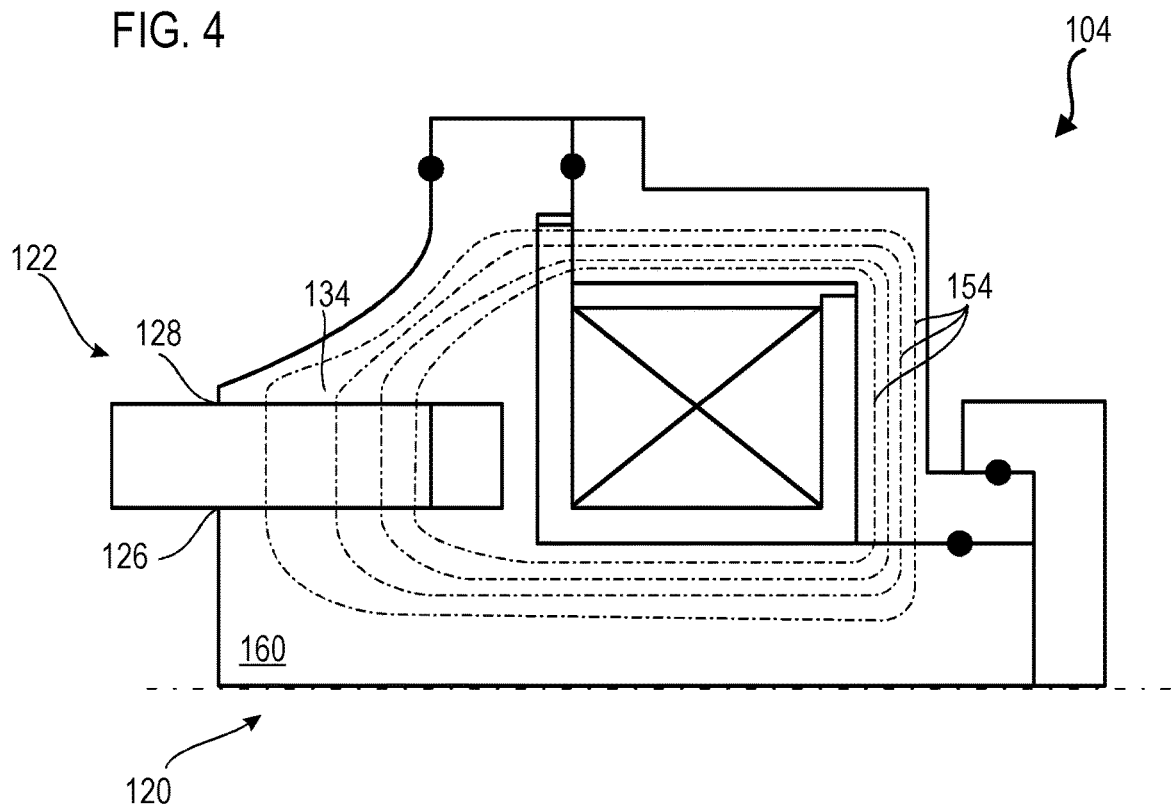
FIG. 4 shows an electromagnetic actuator according to a second embodiment of the invention.

FIG. 4 shows an electromagnetic actuator 104 according to a second embodiment of the invention. This FIG. 4 repeats the numbering of the preceding figures for identical or similar elements, but the numbering is incremented by 100. Specific numbers are used for elements specific to this embodiment.

The electromagnetic actuator 104 may be substantially identical to that of FIG. 3, but differs from it in that it has only a single annular chamfer 134, which radially delimits the outer radial gap 128 for example. The inner radial gap 126 may be delimited by a cylindrical portion 160 which extends the casing 120 towards the plunger 122. The circuit therefore has more ferromagnetic material carrying the magnetic flux lines 154.

Figure 5:
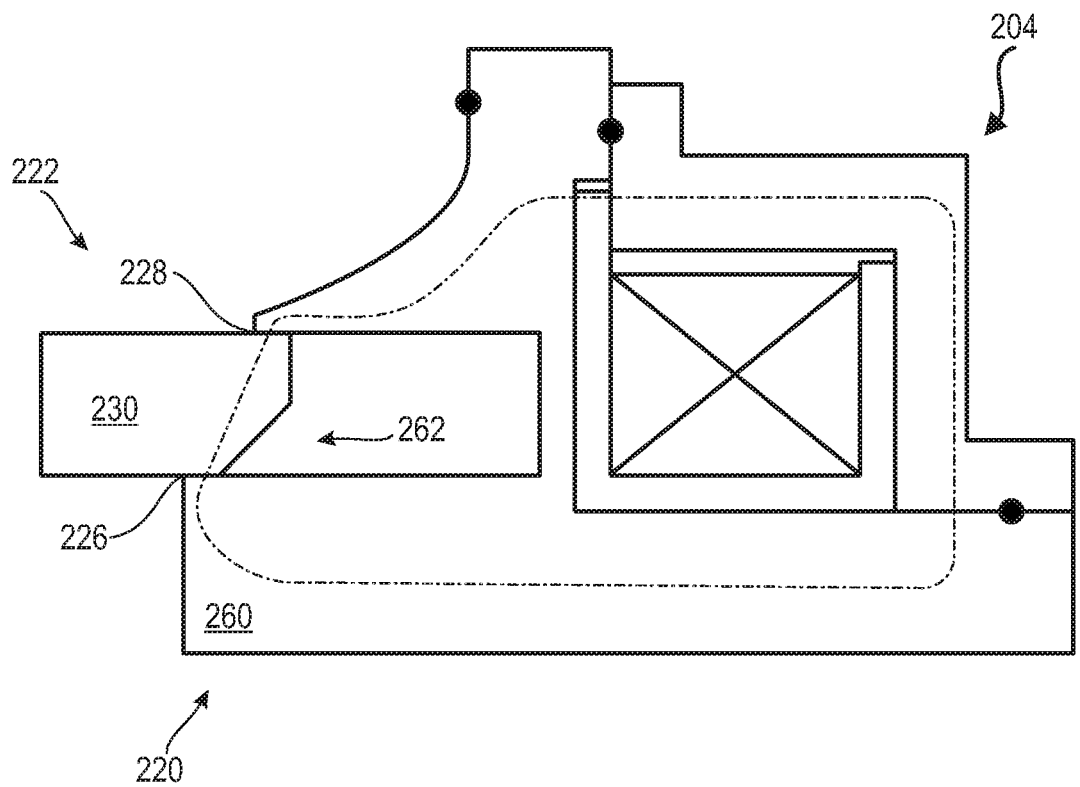
FIG. 5 shows an electromagnetic actuator according to a third embodiment of the invention.

FIG. 5 shows an electromagnetic actuator 204 according to a third embodiment of the invention. This FIG. 5 repeats the numbering of the preceding figures for identical or similar elements, but the numbering is incremented by 200. Specific numbers are used for elements specific to this embodiment.

The electromagnetic actuator 204 according to the second embodiment may be substantially identical to that of FIG. 4, but differs from it in the axial offset of the radial gaps (226; 228). The cylindrical portion 260 may continue beyond the outer gap 228, and further extend the casing 220. The plunger 222 may have an optional chamfer 262, formed for example on the tubular portion 230 of the plunger 222. This chamfer 262 is directed radially inwards, that is to say towards the cylindrical portion 260. Here again, a greater amount of ferromagnetic material becomes available.

Figure 6:
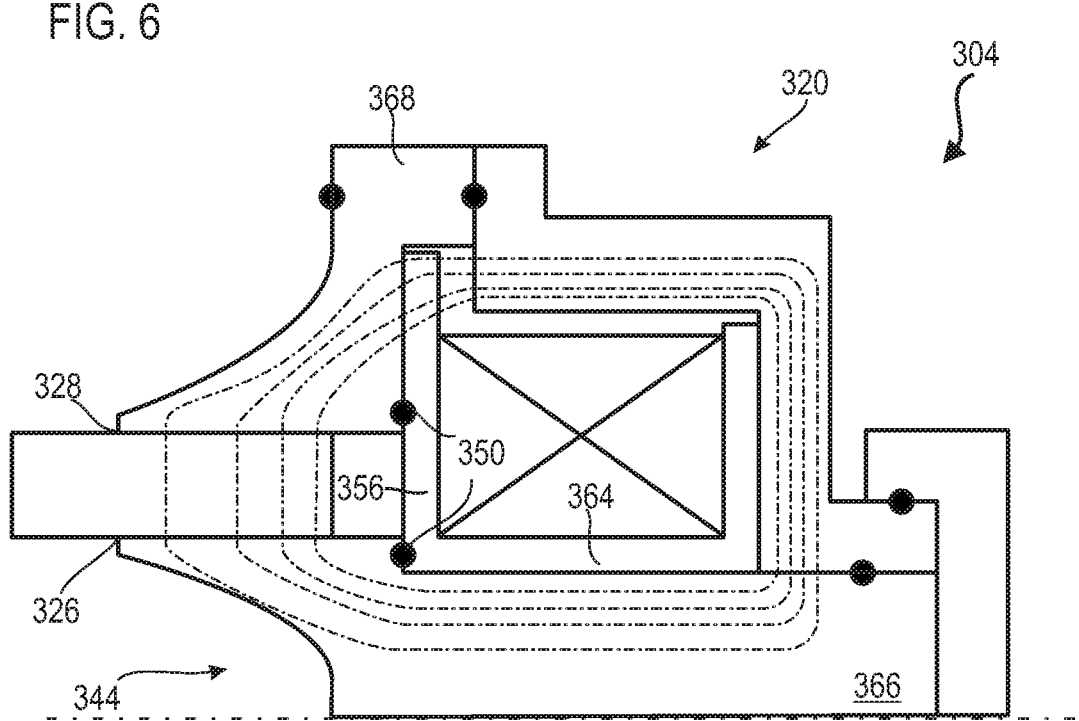
FIG. 6 shows an electromagnetic actuator according to a fourth embodiment of the invention.

FIG. 6 shows an electromagnetic actuator 304 according to a fourth embodiment of the invention. This FIG. 6 repeats the numbering of the preceding figures for identical or similar elements, but the numbering is incremented by 300. Specific numbers are used for elements specific to this embodiment.

The electromagnetic actuator 304 according to the fourth embodiment may be substantially identical to that of FIG. 3. It differs from it in its casing 320, which is then split circularly between the radial gaps (326; 328), and in the partition 356 which is formed by the coil support 364. Additional gaskets 350 are added. The core 344 is divided circularly into an inner bar 366 surrounded by an outer ring 368, which radially delimit the inner radial gap 326 and the outer radial gap 328 respectively. This separation makes it possible to use different materials in the magnetic circuit. The bar 366 and the ring 368 may be connected via the support 364 which may be made of a ferromagnetic material, or alternatively of a non-magnetic material so that more of the magnetic flux passes through radial gaps (326; 328) in order to increase the ferromagnetic force.

The invention claimed is:

1. An electromagnetic actuator, comprising:
a magnetic casing;
an electromagnetic plunger movable in an axial direction relative to the casing, the plunger comprising a first axial half;
a first radial gap which is formed radially between the plunger and the magnetic casing, and which is positioned axially at the first axial half of the plunger; and
a second radial gap which is formed radially between the plunger and the magnetic casing, and which is positioned axially at the first axial half of the plunger, the casing comprising a first annular chamfer radially delimiting the first gap, and a second annular chamfer radially delimiting the second gap,
wherein the plunger is at least movable between a first position and a second position in which the radial thickness of at least one, or of each, gap is equal,
wherein an annular tight enclosure is delimited by the casing and the plunger, the casing having a vent fluidly connected to the annular tight enclosure.

2. The electromagnetic actuator according to claim 1, wherein the first gap and the second gap are formed from a same axial end of the plunger, and/or from a same axial end of the casing.

3. The electromagnetic actuator according to claim 1, wherein the first gap and the second gap are positioned at a same level axially or are axially offset.

4. The electromagnetic actuator according to claim 1, wherein the casing comprises a one piece portion radially delimiting the first gap and the second gap.

5. The electromagnetic actuator according to claim 1, comprising a magnetic source capable of producing a magnetic field in the casing and the plunger, at least one, or each, gap being positioned outside said magnetic source, the plunger being positioned outside said magnetic source.

6. The electromagnetic actuator according to claim 1, wherein the vent passes through the second annular chamfer.

7. The electromagnetic actuator according to claim 1, wherein the plunger comprises a tubular portion extending radially between the first gap and the second gap, in the first position and in the second position.

8. The electromagnetic actuator according to claim 7, wherein the tubular portion of the plunger has a constant radial thickness.

9. The electromagnetic actuator according to claim 1 wherein the first or second annular chamfer has an annular profile which is curved or substantially straight.

10. An electromagnetic valve for fluids comprising an electromagnetic actuator, said electromagnetic actuator comprising:
a magnetic casing;
an electromagnetic plunger movable in an axial direction relative to the casing, the plunger comprising a first axial half;
a first radial gap which is formed radially between the plunger and the magnetic casing, and which is positioned axially at the first axial half of the plunger; and
a second radial gap which is formed radially between the plunger and the magnetic casing, and which is positioned axially at the first axial half of the plunger, the casing comprises a portion made in one piece, radially delimiting the first gap and the second gap, the portion comprising a first annular chamfer radially delimiting the first gap, and a second annular chamfer radially delimiting the second gap, wherein the plunger is at least movable between a first position and a second position in which the radial thickness of at least one, or of each, gap is equal, wherein an annular tight enclosure is delimited by the casing and the plunger, the casing having a vent fluidly connected to the annular tight enclosure.

11. The electromagnetic valve according to claim 10, wherein the second chamfer is positioned radially in the plunger and/or in the first chamfer.

12. The electromagnetic valve according to claim 10, wherein at least one, or each, annular chamfer has an annular profile which is curved or substantially straight.

13. The electromagnetic valve according to claim 10, wherein at least one, or each, annular chamfer has an annular profile which is generally inclined at an angle $\beta$ to the axis of movement of the plunger, said angle $\beta$ being less than or equal to 45°.

14. The electromagnetic valve according to claim 10, wherein the casing comprises an annular partition radially connecting the first gap, to the second gap.

15. The electromagnetic valve according to claim 14, wherein the axial thickness of the partition is less than a radial height of the partition, and/or less than the thickness of the annular chamfers.

16. The electromagnetic valve according to claim 10, wherein the casing comprises a core and a cover which between them enclose an annular chamber, notably for the magnetic field source.

17. The electromagnetic valve according to claim 16, wherein the cover and/or the core are each made in one piece.

18. The electromagnetic valve according to claim 16, wherein the core comprises an outer ring and an inner bar separated from the outer ring, the annular partition possibly being formed by a coil support.

* * * * *